United States Patent Office 3,793,258
Patented Feb. 19, 1974

3,793,258
PROCESS FOR THE ANIONIC POLYMERIZATION
OF LACTAMS
Klaus Reinking, Bert Brassat, and Kurt Schneider, Krefeld-Bockum, Germany, assignors to Bayer Aktiengesellschaft, Leverkusen, Germany
No Drawing. Filed July 16, 1971, Ser. No. 163,413
Claims priority, application Germany, July 18, 1970,
P 20 35 733.9
Int. Cl. C08g 20/18
U.S. Cl. 260—78 L
6 Claims

ABSTRACT OF THE DISCLOSURE

The invention relates to an improved process for the anionic polymerization of a lactam having at least 5 ring members in the presence of an alkaline catalyst and an activator, wherein an alkali metal lactamate, the catalyst, dissolved in a mixture of a α-pyrrolidone and a lactam member selected from the groups consisting of a single lactam and a mixture of lactams having at least 6 ring members, is added to the lactam melt containing the activator.

---

This invention relates to a process for the anionic polymerization of lactams in the presence of basic catalysts and activators, the catalysts being solutions of alkali metal lactamates.

If lactams with more than 5 carbon atoms in the ring are heated to temperatures of above 160° C. in the presence of alkaline substances, for example in the presence of alkali metal alcoholates or in the presence of alkali metal salts of the lactams, they polymerize to form corresponding polyamides. This polymerization reaction, which has an anionic mechanism is completed much more quickly than the so-called hydrolytic polymerization of lactams, in which acids are used as catalysts. The alkaline polymerization of lactams can be further accelerated by the presence of compounds having an acylating effect, for example isocyanates, ketones, carboxylic acid chlorides or carboxylic acid imides. In the presence of these activators polymerization of lactams is completed in a matter of minutes. Therefore it is possible to polymerize continuously the lactams in single-shaft or twin-shaft screw extruders to form corresponding polyamides which can be directly extruded in the form of profiles or sections. The activated alkaline polymerization of lactams thus makes it possible to obtain a finished polyamide profile from a lactam in a single operation.

The embodiment of this process has been the subject of various patent specifications. In most instances, the process is carried out by delivering two lactams melts, one of which contains the alkaline catalyst and the other the activator, the so-called "two pot process," from two heatable supply vessels through metering pumps into a mixing vessel in which they are homogeneously mixed. The lactam melt, which is now polymerizable, is then delivered through another metering pump into a screw extruder in which it is heated to a temperature of at least 220° C. Polymerization takes place and the polyamide formed is extruded from the die of the extruder into a following callibrating tool. The polyamide then issues from the calibrating tool in the form of the required profile.

A serious problem which arises in this polymerization process is that it is not easy to handle catalyst-containing lactam melts. In this connection, it must be appreciated that the melts in question can, even when not combined with an activator-containing melt, polymerize into polyamides providing they are heated to a sufficiently high temperature. Accordingly, it is only possible to prepare catalyst-containing melts from lactams which melt at low temperatures, for example from ε-caprolactam (melting point 69° C.). Lactams which melt at high temperatures, for example lauric lactam (melting point 153° C.) cannot be polymerized by this process, because they would actually polymerize in the supply vessel. Moreover, ε-caprolactam melts containing alkaline catalysts, for example alkali metal lactamates, also polymerize gradually at relatively low temperatures, for example at 100° C., and precipitates of oligomers that are insoluble in the melt are initially formed, as a result of which the melts harden to a jelly-like consistency. Polyamide-6 is formed during the further course of polymerization. Since the lactam melts may possibly have to remain in the supply vessel for prolonged periods during polymerization in the screw extruder, for example in the event of stoppage of the screw extruder, the possibility that the melt containing the catalysts may actually polymerize in the supply vessel constitutes a serious disadvantage of the process.

This disadvantage can be obviated if the alkaline catalyst is dissolved at room temperature in a solvent that does not interfere with polymerization and the resulting solution is subsequently added to the lactam melt of elevated temperature containing the activator, either immediately before it enters the extruder or after it has entered the extruder. According to the embodiment of the process it is impossible for the lactam to polymerize prematurely in the supply vessel.

Such catalyst solutions which are liquid at room temperature, are for example solutions of alkali metal salts of C-methyl-ε-caprolactam in high-boiling aromatic hydrocarbons. Unfortunately, the disadvantage of these solution is that, although the aromatic hydrocarbons are compatible with the lactams, they are not compatible with the polyamides formed therefrom. Therefore the aromatic hydrocarbons are present heterogeneously distributed in the polyamide profiles formed and thus affect the mechanical properties and the surface quality of the profiles.

α-Pyrrolidone, which melts at temperatures of about 25° C., seems to be a suitable solvent for alkali metals, for it can polymerize only in the presence of alkaline catalysts and activators and not in the absence of activators at elevated temperature. Solutions of this kind in which the alkali metals are present in the form of salts of α-pyrrolidone are easy to prepare, for example, by distilling methanol from a solution of an alkali metal methoxide and of α-pyrrolidone in methanol. These solutions, however, are not suitable for the activated anionic polymerization of lactams, they solidify to a jelly-like consistency on standing at room temperature, and can only be partly liquefied by heating, so that it is not possible to deliver these solutions through pipes by means of metering pumps.

Surprisingly, it has now been found that solutions of alkali metal in mixtures of α-pyrrolidone with other lactams, for example ε-caprolactam or capryl lactam, are liquid at room temperature and remain liquid even after prolonged storage at room temperature. Accordingly, these solutions are suitable as catalyst solutions for the activated anionic polymerization of lactams.

In the process for the production of polyamides by anionic polymerization of a lactam having at least 5 ring members in the presence of an alkaline catalyst and an activator wherein as catalyst an alkali metal lactam, dissolved in a lactam or in an inert solvent, is added to the lactam melt containing the activator, the improvement which comprises dissolving an alkali metal lactamate in a mixture of a α-pyrrolidone and a lactam member selected from the group consisting of a single lactam and a mixture of lactams having at least 6 ring members and adding the solution thus obtained and which is liquid at room temperature to said lactam melt containing the activator.

The technical advantage of this solution over the solutions of alkali metal salts of C-methyl-ε-caprolactam in aromatic hydrocarbons is that the lactams used as solvents in the solutions according to the invention can themselves be polymerized, i.e. participate in the polymerization reaction. Accordingly, the polyamides produced with the solutions according to the invention do not contain any alien constituents heterogeneously distributed therein. For this reason, the mechanical properties are not adversely affected.

Lactams having at least 5 ring members such as α-pyrrolidone, ε-capro-, capryl- and lauric lactam and the lactam of ω-aminoenanthic acid and mixtures thereof can be polymerized according to the improved process. As activators alkyl-, cycloalkyl-, aryl-, mono- or polyisocyanates such as butylisocyanate, hexylisocyanate, octylisocyanate, cyclohexylisocyanate, naphthylisocyanate, hexamethylenediisocyanate, phenylenediisocyanate, the reaction products of isocyanates and lactams such as hexamethylene-1,6-bis-carbaminocaprolactam, dialkyl-, dicycloalkyl-, diaryl-carbodiimide, such as diisopropyl-carbodiimide, dicyclohexyl-carbodiimide and N-acylated lactams such as N-acyl-caprolactam are used.

The composition of the solvent-mixture can be varied within wide limits. Preferably in addition to α-pyrrolidone, the lactam which it is intended to be polymerized is used as a second solvent component. The percentage composition of the lactam mixture is thus governed by the solidification temperature of the mixture of α-pyrrolidone and the particular lactam. Any mixtures which solidify at temperatures below 25° C., i.e. which are liquid at room temperature, are suitable. Thus any mixture of α-pyrrolidone and ε-caprolactam which contains maximal 50% by weight of ε-caprolactam, any mixture of α-pyrrolidone and capryllactam which contains maximal 38% by weight capryllactam and any mixture of α-pyrrolidone and lauric lactam which contains maximal 7% by weight of lauriclactam are used as solvent mixtures.

Alkali metals such as potassium and sodium or compounds of said metals are used to prepare the alkaline catalyst. The catalyst solutions according to the invention can be prepared in different ways, for example by dissolving the alkali metals in the lactam mixture, in which case the alkali metal salts of the lactams are formed by elimination of hydrogen. It is also possible to dissolve an already prepared alkali metal lactamate, for example sodium caprolactamate, potassium caprolactamate, sodium capryllactamate, potassium capryllactamate, sodium lauric lactamate, potassium lauric lactamate in the lactam mixtures with heating. The cooled solution is then used. The simplest and safest method of preparing a catalyst solution according to the invention is to dissolve α-pyrrolidone and/or the other lactam in a solution of the alkali metal methoxide in methanol in the calculated weight ratios and then to distill off the methanol in vacuo.

The highest concentration of the alkaline catalyst, calculated from the concentration of the alkali metal in the solution according to the invention, is governed by the solubility of the alkali metal lactamate in the lactam mixture and thus by the saturation temperature of the lactam mixture. At room temperature, for example, this solubility limit lies at 16% by weight of potassium, 9% by weight of sodium, in a mixture of equal parts by weight of α-pyrrolidone and ε-caprolactam.

But it is more favorable to use solutions of lower concentration because they can be dosed more accurately and because of their low viscosity they can be handled easier.

The catalyst solutions are pale yellow, clear liquids of low viscosity. They are distinguished by their outstanding stability. Even after they have been heated for days at 80° C., they remain liquid on cooling to room temperature. Their catalytic activity remains unchanged, even after prolonged standing at room temperature or after heating for several days at 80° C.

The catalyst solutions according to the invention are added to the polymerization mixture in such amounts that the alkali metal lactamate content lies between 0.1 to 2.0% by weight.

The preparation and application of the solutions according to the invention are illustrated by the following examples.

EXAMPLE 1

144 g. of ε-caprolactam are dissolved at 40 to 50° C. in 110 g. of a 17.7% by weight solution of potassium methoxide in methanol. After cooling to 20° C., 144 g. of α-pyrrolidone are added and the methanol is distilled off in vacuo at a maximum bath temperature of 50° C. A pale yellowish, slightly viscous, solution containing 3.6% by weight of potassium in the form of potassium lactamate, is left behind.

1 g. of this solution is introduced with a pipette into a solution heated to 150° C. of 0.5 g. of hexamethylene diisocyanate in 110 g. of ε-caprolactam. The ε-caprolactam is completely polymerized over a period of 90 seconds.

EXAMPLE 2

128 g. of ε-caprolactam are dissolved at 40 to 50° C. in 300 g. of a 7.85% by weight solution of sodium methoxide in methanol. The solution is then cooled to 20° C., followed by the addition of 128 g. of α-pyrrolidone. The methanol is then distilled off in vacuo at a maximum bath temperature of 50° C. A pale yellow, clear and viscous solution containing 3.76% by weight of sodium in the form of sodium lactamate, is left behind.

0.5 g. of this solution are introduced with a pipette into a solution heated to 150° C. of 0.5 g. of hexamethylene diisocyanate in 110 g. of ε-caprolactam. The ε-caprolactam is completely polymerized over a period of 90 seconds.

EXAMPLE 3

A twin shaft extruder serves as the polymerization equipment. The feed opening is closed and through a bore located at this point the solution heated to 150° C. and consisting of 0.5 part by weight hexamethylene diisocyanate and 0.4 part by weight N-benzylacetamide in 100 parts by weight of caprolactam is fed by means of a geared pump into the cylinder at a speed of 12 kg./h. At the same time the catalyst solution, which was prepared in accordance with Example 1, is delivered through a second bore at a speed of 150 g./h. by means of a metering pump into the cylinder.

The cylinder temperature is kept at 230° C. throughout the experiment; the mixture is extruded through a nozzle heated to 250° C. The extrusion-strand is cooled in water and granulated. A polyamide granulate is obtained which after extraction with water and drying is processed to test specimens which exhibit the following mechanical properties (tested immediately after extrusion):

| | |
|---|---:|
| Yield stress _____kp./cm.$^2$__ | 790 |
| Tensile strength _____kp./cm.$^2$__ | 640 |
| Breaking elongation _____percent__ | 240 |
| E modulus _____kp./cm.$^2$__ | 26.000 |

The relative viscosity of the material (measured in m-cresol at 25° C.; c.=1 g./100 ml.) amounts to 4.2.

EXAMPLE 4

3000 g. of a sodium methylate solution in methanol (7.85% by weight of Na) is heated to about 55° C. and 2500 g. of caprolactam are added; the mixture is stirred until the caprolactam has completely dissolved. After cooling the solution to 25° C., 2600 g. of α-pyrrolidone are added and the methanol distilled off in vacuo at a maximum bath temperature of 50° C. A clear, bright yellow solution is obtained which begins to solidify at −10° C. and when heated to 20° C. becomes clear again.

To 190 g. ω-lauric lactam melted by heating to 160° C. 0.6 g. of hexamethylene diisocyanate are added and polymerized after the addition of 2 ml. of the above described solution with 60 seconds to form a solid polyamide block.

EXAMPLE 5

A single shaft extruder serves as a polymerization equipment. It has a three-zone screw of the conventional type. The feed-opening is closed and through a bore located at this point a solution heated to 150° C. and consisting of 0.7 parts by weight hexamethylene diisocyanate and 0.4 parts by weight of N-benzyl acetamide in 100 parts by weight caprolactam is fed by means of a geared pump at a speed of 30 kg./h. into the cylinder. Simultaneously the catalyst solution is delivered through a second bore at a speed of 600 g./h. by means of a metering pump into the cylinder. The catalyst solution is used as described in Example 4. The cylinder temperature is 230° C. throughout the experiment; the mixture is extruded through a nozzle heated to 250° C. The strand is cooled in water and granulated. The resulting polyamide granulate has similar properties to those described in Example 3.

We claim:

1. In a process for the production of polyamides by anionic polymerization of a lactam having at least 5 ring members in the presence of an alkaline catalyst and an activator wherein as catalyst an alkali metal lactamate, dissolved in a lactam or in an inert solvent, is added to the lactam melt containing the activator, the improvement which comprises dissolving an alkali metal lactamate in a solvent mixture selected from the group consisting of (1) of mixture of α-pyrrolidone and of maximal 50% by weight of ε-caprolactam; (2) a mixture of α-pyrrolidone and of maximal 7% by weight of lauriclactam; and (3) a mixture of α-pyrrolidone and of maximal 38% by weight of capryllactam, and adding the solution thus obtained and which solidifies below 25° C. to said lactam melt containing the activator.

2. In a process as claimed in claim 1, wherein the alkali metal lactamate is dissolved in a mixture of α-pyrrolidone and the lactam which is used for polymerization.

3. In a process as claimed in claim 1, wherein the alkali metal lactamate is dissolved in a mixture of α-pyrrolidone and maximal 50% by weight ε-caprolactam.

4. In a process as claimed in claim 1, wherein the alkali metal lactamate is dissolved in a mixture of α-pyrrolidone and maximal 7% by weight of lauriclactam.

5. In a process as claimed in claim 1, wherein the alkali metal lactamate is dissolved in a mixture of α-pyrrolidone and maximal 38% by weight capryllactam.

6. In a process as claimed in claim 1, wherein the catalyst solution is added to the lactam melt in such amounts that the alkali metal lactamate content lies between 0.1 to 2.0% by weight.

References Cited

UNITED STATES PATENTS

| | | | |
|---|---|---|---|
| 2,638,463 | 5/1953 | Ney et al. | 260—78 P |
| 2,739,959 | 3/1956 | Ney et al. | 260—78 P |
| 3,075,953 | 1/1963 | Carlson et al. | 260—78 P |
| 3,575,938 | 4/1971 | Tierney | 260—78 L |

WILLIAM H. SHORT, Primary Examiner

L. M. PHYNES, Assistant Examiner

U.S. Cl. X.R.

260—30.4 N, 78 P